United States Patent

[11] 3,594,775

[72] Inventor Norbert K. Fox
  903 Grand Ave., Ames, Iowa 50010
[21] Appl. No. 840,408
[22] Filed July 9, 1969
[45] Patented July 20, 1971

[54] SYSTEM FOR DETECING FROST, SNOW AND ICE ON A ROAD SURFACE
  5 Claims, 32 Drawing Figs.
[52] U.S. Cl. .................................................. 340/234
[51] Int. Cl. ................................................G08b 21/00
[50] Field of Search ......................................... 340/234;
  244/134 F; 73/170

[56] References Cited
  UNITED STATES PATENTS
  3,229,271 1/1966 Frant ........................... 340/234
  3,412,326 11/1968 Jones et al. .................. 340/234 X Primary Examiner—John W. Caldwell
Assistant Examiner—Daniel Myer
Attorney—Rudolph L. Lowell ABSTRACT: A transducer has a member with a sensing surface located in the road level which member, when dry and a controlled heat is applied thereto has a basically linear time-temperature curve. The forming of ice on the sensing surface modifies the linear curve by effecting a holdup in the temperature rise due to the heat of fusion of the ice. The resultant heating curve characteristics of the sensing surface are converted to voltage by a thermocouple means, and the variations in the voltage effected by the holdbacks in the heating curve are double differentiated to produce the second derivative of the initial time-temperature curve. Voltage excursions that exceed predetermined positive and negative levels within specified time intervals are utilized to indicate an icy road condition.

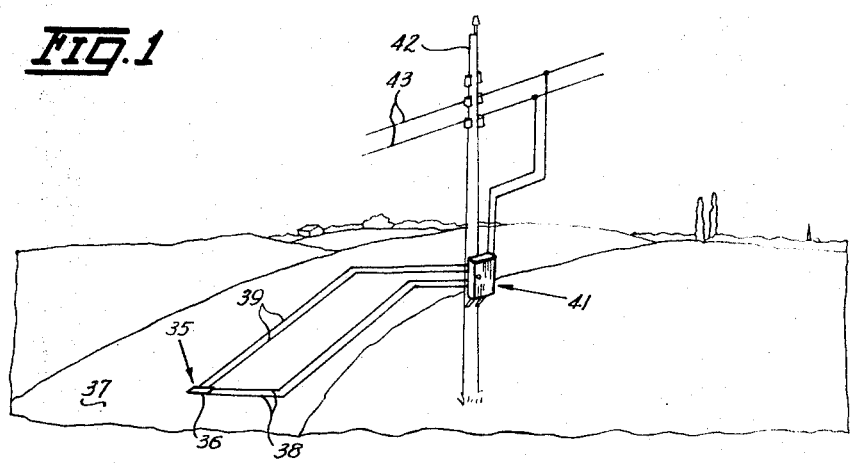
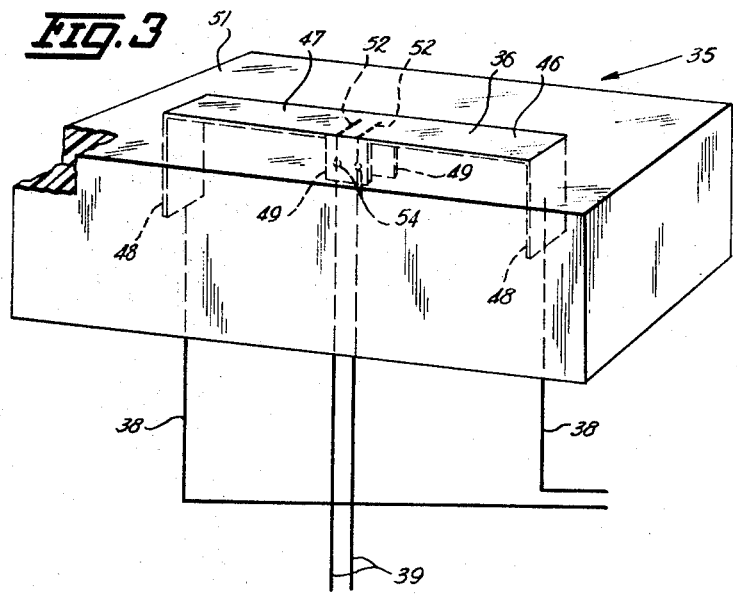
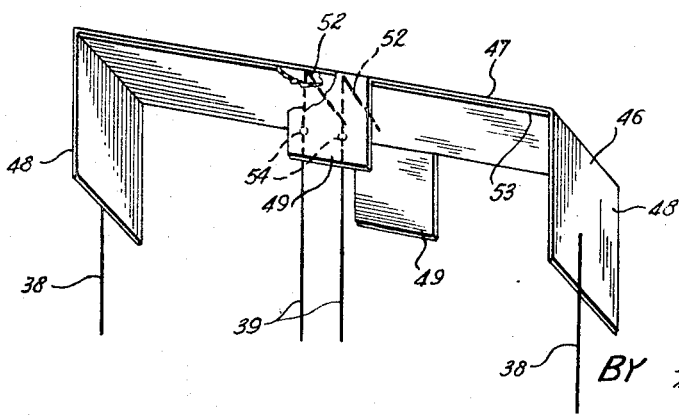
INVENTOR.
NORBERT K. FOX
ATTORNEY.

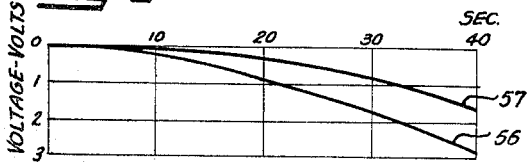
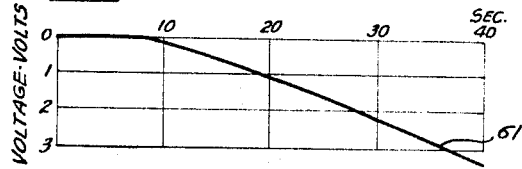
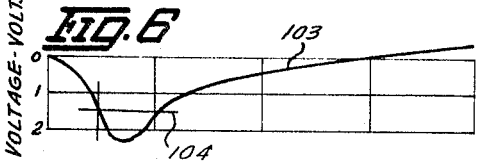
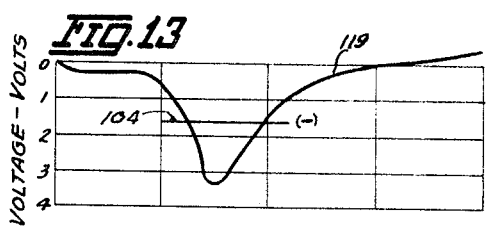
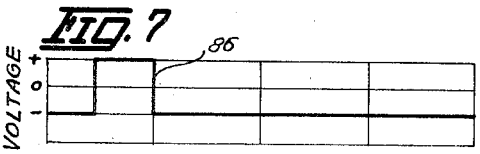
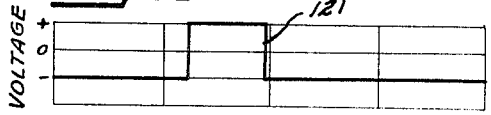
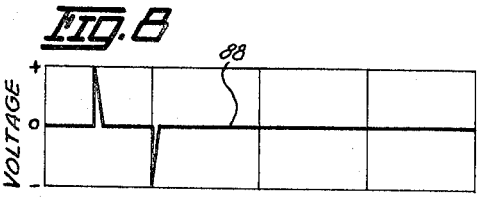
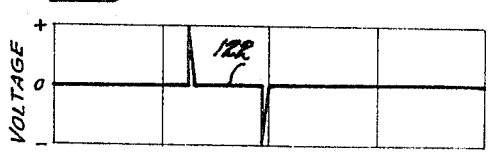
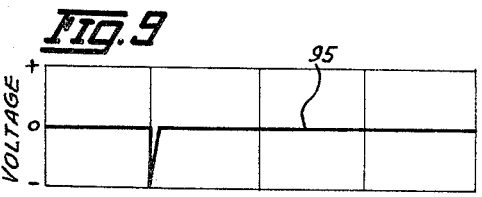
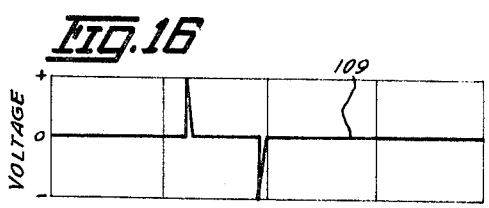
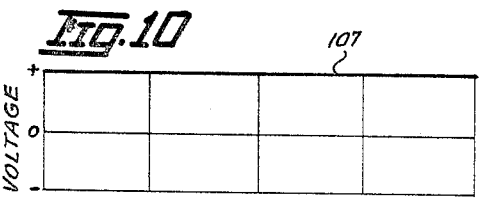
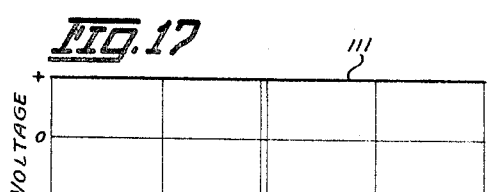
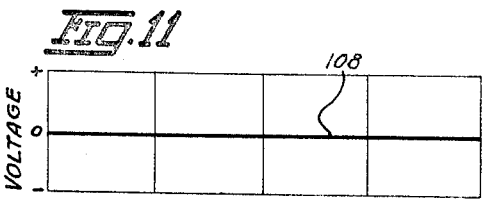
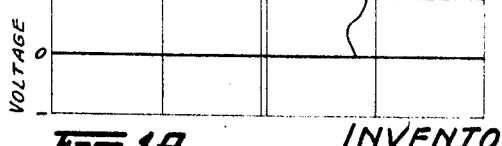
INVENTOR.
NORBERT K. FOX
BY
ATTORNEY.

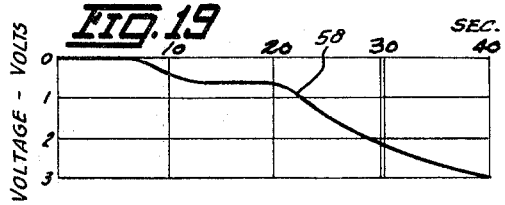
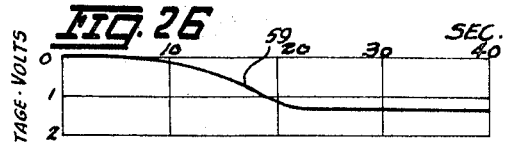
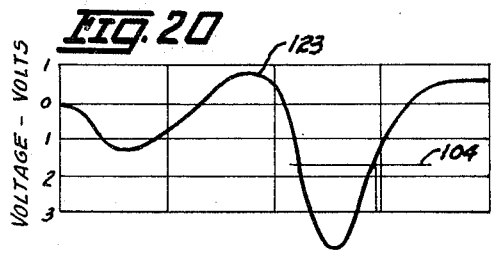
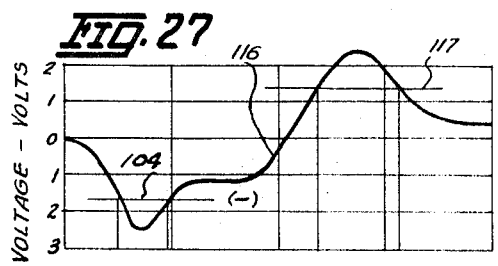
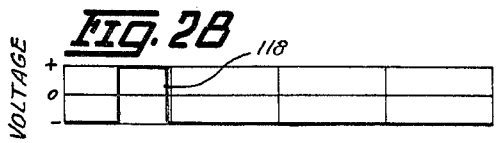
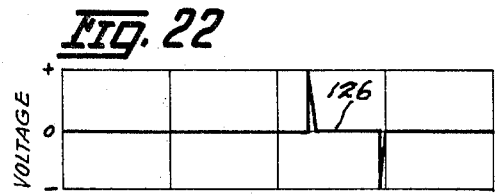
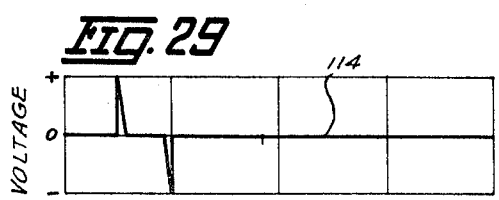
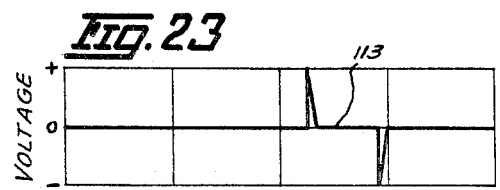
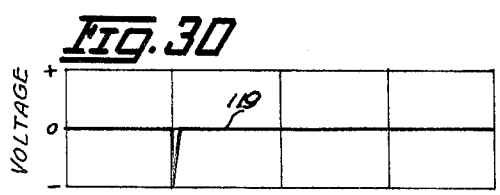
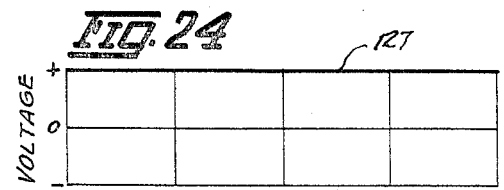
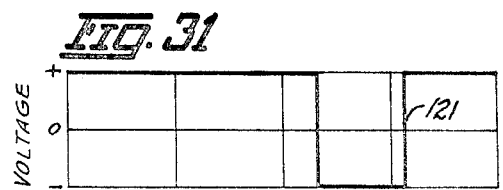
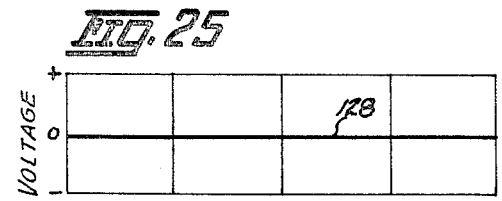
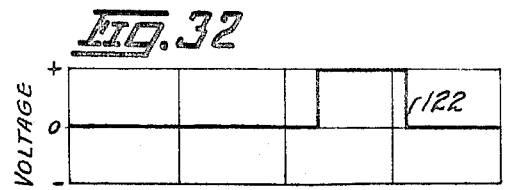
INVENTOR.
NORBERT K. FOX

SYSTEM FOR DETECING FROST, SNOW AND ICE ON A ROAD SURFACE

SUMMARY OF THE INVENTION

The system is capable of detecting in frozen form any substance that has an appreciable heat of fusion, accurately and at predetermined time intervals. Programmed heat is applied to the sensing surface to permit freezing of the substance on the surface so that nonlinear curve characteristics result from the heat of fusion. Although voltage differences are predicted on the absolute difference between the temperature of the sensing surface and ambient temperature, this temperature difference is not used directly to detect ice, but is double differentiated with respect to the heating time to produce a positive indication of freezing on the sensing surface. As a result, no false indications of freezing will be given due to a substance being unfrozen but in the neighborhood of freezing. The system is compact and readily installed in duplicate at remotely located highway stations and homed into a central station for receiving ice detection signals. The apparatus is capable of detecting frozen formations of 0.002 inches in thickness, even when the sensing surface may be coated with soluble salts such as calcium or sodium chloride. Also an accurate reading of ice detection is not influenced by layers of water on the sensing surface, or by the travel of vehicles over the sensing surface.

BRIEF DESCRIPTION OF THE DRAWINGS

FIG. 1 shows the system of this invention installed for use to detect the formation of ice on a highway;

FIG. 2 is an enlarged perspective view of a transducer unit, shown generally in FIG. 1, which forms part of the system, with some parts broken away to more clearly show its construction;

FIG. 3 is a perspective view of a sensing member that forms part of the transducer unit;

FIGS. 5 through 11, inclusive, show graphically the response of the electrical circuit of FIG. 4 to provide readable voltage outputs for a dry condition of the transducer sensing surface;

FIGS. 12 through 18, inclusive, are illustrated similarly to FIGS. 5 through 11, and show the electrical response for a very light deposit of snow or ice on the sensing surface at the melting point;

FIGS. 19 through 25, inclusive, are illustrated similarly to FIGS. 5 through 11, and show the electrical response for a very light deposit of snow or ice on the sensing surface at a temperature of 18° F; and FIGS. 26 through 32, inclusive, are also illustrated similarly to FIGS. 5 through 11, and show the electrical response for a heavy cover of snow or ice on the sensing surface at a temperature of 10° F.

DETAIL DESCRIPTION OF A PREFERRED EMBODIMENT

Figure 4:
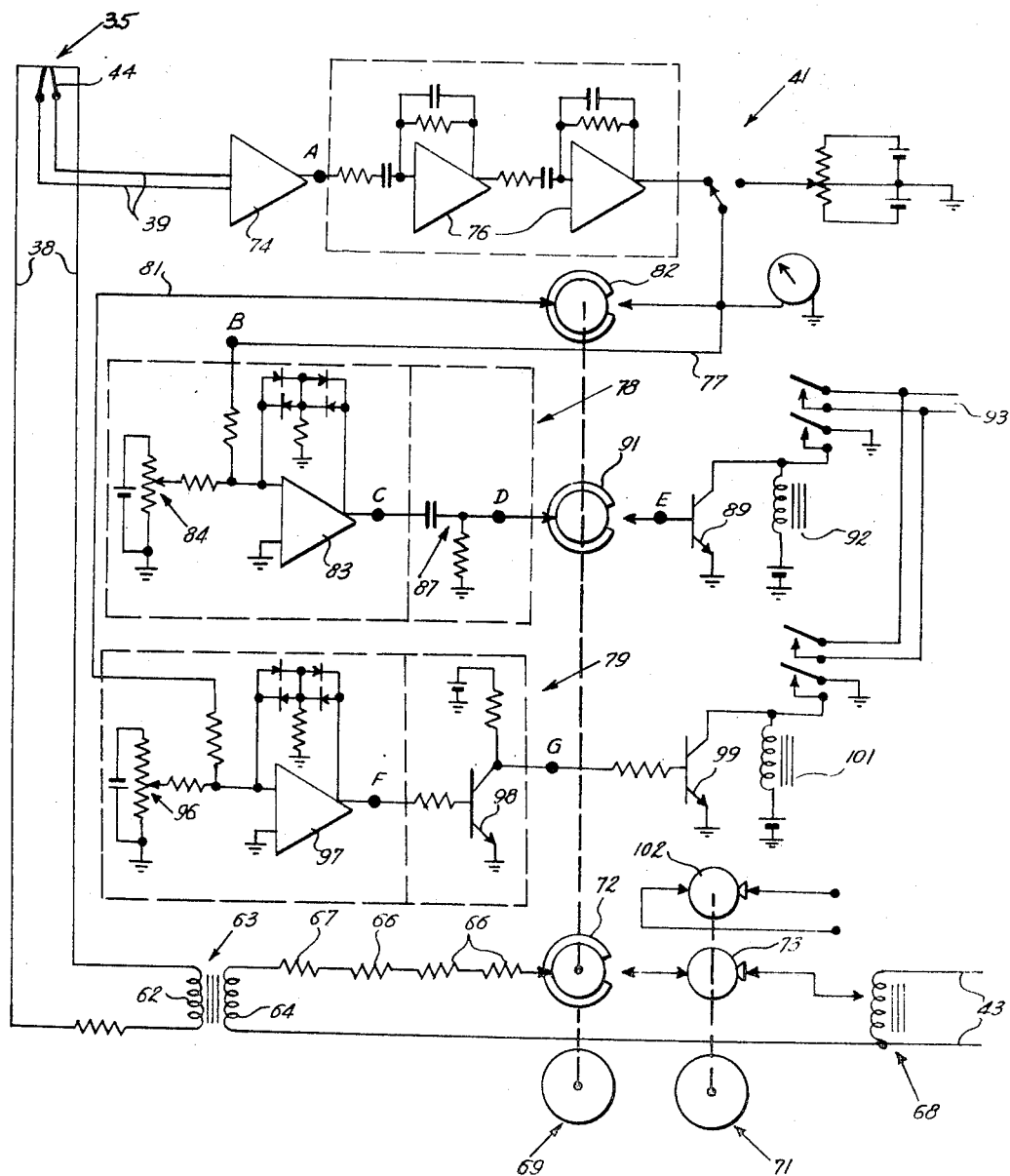
FIG. 4 is an electrical circuit for the system.

Referring to FIG. 1 of the drawings, the system of this invention is seen to include a transducer unit 35, having a sensing surface 36 located in the plane of the traveled surface of a highway or road 37. The transducer unit 35 is connected through lead lines 38 and 39, to an electrical system, indicated generally at 41 in FIG. 1, which may be carried on a utility pole 42 that is conveniently located relative to the road installed transducer unit 35. The electrical system 41 is powered directly from a usual utility line 43.

The electrical system 41 (FIG. 4) supplies a programmed heating current to the transducer unit 35 through the lead lines 38. Lead lines 39 return the output voltage of a thermocouple 44 in the transducer unit to the electrical system 41 to evaluate any possible icing condition. The output of the electrical system may be fed into telephone lines (not shown) or into a radio transmitter (not shown) for transmission to a remote receiving point.

As shown in FIG. 2, the transducer unit 35 includes a metal member 46, formed of a stainless steel sheet material and having a rectangular shaped body member 47 one side of which is exposed and constitutes the sensing surface 36. The body member 47 has laterally projected end legs 48, and intermediate side legs 49. The metal member 46 is embedded within a plastic filler material 51 so as to have exposed only the outer or sensing surface 36 of the metal member 46.

Soldered to the center of the unexposed side of the body member 47 are 0.020 inches diameter constantan thermocouple wires 52 which together with the unexposed side of the body member 47 are covered by a thin silicone rubber coating indicated at 53. Soldered to the thermocouple wires 52 at 54 re the lead lines 39 which are of solid copper wire. The end legs or sections 48 are soldered to the copper wire leads 38. In the embedding of the metal member 46 within the plastic filler 51, which may be Evercoat Formula 27, available from the Fibre Glass Evercoat Company of Cincinnati, Ohio, the body member 47 should be free to move toward and away from the filler material for expansion and contraction purposes.

In a test run for detecting ice, a programmed heating current is supplied to the sensing surface 36 through the lead lines 38. With a dry sensing surface 36 there is produced at point A in the circuit of FIG. 4 a basically linear decrease in voltage output from the thermocouple 44 with respect to time, as exemplified by the curve 56 in FIG. 5. The presence of any substance on the outer or sensing surface 36 of the body member 47 will modify this linear heating characteristic. Thus substances such as sand, dirt or water on the sensing surface 36 will act merely to rotate the curve 56 toward the time axis as shown by the curve 57 in FIG. 5.

However, substances such as snow, or ice or other materials having an appreciable heat of fusion will produce a hold up or a deflection in the linear heating characteristic of the metal member 46. For ice and snow at a temperature below the melting points thereof this hold up is indicated by curves 58 and 59 in FIGS. 19 and 26, respectively. When the ice and snow is at the melting point the resultant curve 61 has a hold up or deflection as shown in FIG. 12.

This hold up in the linear heating characteristic of the sensing surface 36 is utilized to detect the presence on such surface of a material having an appreciable heat of fusion. In the case where either calcium chloride or sodium chloride are present with frozen water the melting point is indeterminant. In order to obtain the same time of temperature hold up at different melting point temperatures it is thus desirable that the heating be programmed to produce a linear change of temperature with respect to time.

The time or period of hold up produced in the linear heating curve by the presence of a substance with an appreciable heat of fusion within a predetermined heating range may be estimated from the following formula:

(1) $$\Delta t = \frac{mH}{CM \frac{dT}{dt}}$$

Wherein: $\Delta t$ is the duration of temperature hold up in seconds due to the heat of fusion;

$H$ is the heat of fusion of the test material or substance in calories per gram;

$m$ is the weight of the substance or test material in grams;

$M$ is the mass of the metal member 46 in grams;

$C$ is the heat capacity of the metal member 46 in calories per gram per degree centigrade $T$ is the temperature of the detecting or sensing surface 36 in degrees centigrade; and $dT/dt$ is the rate of temperature change of the dry sensing or detecting surface 36 in response to the application of heat.

From this equation it is seen that the duration of a temperature hold up due to the heat of fusion is (a) proportional to the weight of material being melted and to the heat of fusion of the material, and (b) inversely proportional to the heat capacity of the metal structure and to the rate of change of the temperature of the metal member 46 with respect to time.

For a given mass m, of the substance to be detected, and specified time of temperature hold up, Δt, the mass of the metal member 46, and the heating rate dT/dt are the only remaining variables. Thus to obtain a relatively large heating rate, which is desirable, it is necessary for the mass of the metal member 46 to be small. The heat supplied to the transducer unit 35 is obtained by controlling the output of a standard 115 v. AC/6 v. AC transformer with an overall heating time of about 40 seconds.

The mass of the metal member 46 is thus an important factor on the rate of heat application to the transducer unit 35. In one embodiment of the invention the metal member 46 is formed of a 0.006 inches gauge stainless steel shim stock, having a width of five-sixteenths inch and a length of 2 inches between the leg end sections 48. Each end section 48 is half inch long, and each side section 49 is five-sixteenths inch square. The use of stainless steel for the metal member 46 provides for such member having adequate thermal conductivity, a low electrical conductivity, excellent resistance to chemical attack, excellent physical strength and satisfactory soldering characteristics for securement thereto of the copper leads 38 and thermocouple wires 52.

The circuit used to provide the heating requirements for the metal member 46 of this embodiment is shown in FIG. 4, with ice detecting readings being provided for at 90 minute intervals to allow sufficient time for the formation of ice or frost between reading intervals. The leads 38 to the transducer unit 35 are connected to the secondary 62 of a transformer 63. Connected in series in the circuit of the transformer primary 64 are three thermistors 66 (Workman FRT2) and a resistor 67. Power to the primary 64 of the transformer 63 is supplied from a variable autotransformer 68 that is connected to the 115 volt power lines 43. The thermistors 66 are stored at 70° F. between read out intervals in order to obtain reproducible heating characteristics at each read out. The circuit of the primary 64 of the transformer 63 is completed by a pair of timers 69 and 71 which have switch units 72 and 73, respectively, connected in series with the thermistors 66.

The thermocouple leads 39 from the transducer unit 35 are connected to a solid state magnetic thermocouple amplifier 74 so connected that the output voltage of the thermocouple amplifier goes negative with an increase in temperature. This output voltage is double differentiated by passage through a pair of operational amplifiers 76 and associated circuitry. The output from the operational amplifiers 76 is fed through line 77 to a negative voltage level detector 78 and to a positive voltage level detector 79 by a line 81 that is connected to the lead line 77 and has series connected therein a switch unit 82 of the timer 69.

The negative voltage level detector 78 includes an operational amplifier 83 and associated circuitry having a variable resistor 84. When the voltage output from the pair of differentiators 76 to the negative voltage level detector 78 decreases to a voltage level as determined by the adjustment of the variable resistor 84, the output from the operational amplifier 83 changes from a fixed negative voltage to a fixed positive voltage. When the voltage output from the pair of differentiators 76 to the negative voltage level detector 78 increases to the voltage level determined by the setting of the variable resistor 84, the output from the operational amplifier 83 changes from a fixed positive voltage back to its initial negative voltage condition. The change in voltage level from negative to positive and back to negative produces a square wave of voltage at test point C (FIG. 4) which is shown by curve 86 in FIG. 7. This square wave is differentiated by an R-C differentiator 87 to produce a positive pulse on the leading edge of the square wave 86 and a negative pulse on the trailing edge thereof as shown by curve 88 in FIG. 8.

Any output from the RC differentiator 87 that occurs during the initial 8 seconds of heating of the metal member 46 is cut off from the transistor 89 by the action of the switch unit 91 of the timer 69. The switch unit 91 functions to permit read outs from the R-C differentiator 87 over a time interval from 8 to 34 seconds within the heating period of from 0 to 40 seconds. Positive pulses that occur in the 8 to 34 second interval of the 40 second heating period forward biases the transistor 89 which in turn locks the self-latching relay 92 to activate the alarm circuit 93. Negative pulses have no effect on the transistor 89. Curve 95 in FIG. 9, therefore, shows that only the negative pulses fall within the time interval wherein the switch unit 91 of the timer 69 is closed. Thus the ice alarm circuit 93 is not activated.

The timer switch unit 82 closes the circuit for the positive voltage level detector 79 during a 6 second to 25 second interval within the 40 second heating period. When the positive voltage level exceeds the voltage level as set by the variable resistor 96, the output of the operational amplifier 97 changes from a fixed positive voltage to a fixed negative voltage which is then inverted by the transistor inverter 98. The positive output voltage from the inverter 98 forward biases transistor 99 which in turn locks the self-latching relay 101 to activate the alarm circuit 93.

It is thus seen that either a positive or negative voltage excursion from the pair of differentiators 76 can close the ice alarm circuit, provided such voltage excursions are of the level set by the variable resistors 84 and 96, and occur within the proper interval of the heating period as controlled by the timer mechanism 69.

The timer unit 71 (FIG. 4) controls the detector system for operation at 90 minute intervals and includes a switch unit 102 for closing the circuit to the timer 69. The switch unit 72 of the timer 69 provides for a 40 second heating period of the sensing surface 36 of the transducer unit 35.

To graphically illustrate the operating characteristics of the electrical system of FIG. 4, reference is made to FIGS. 5—11, inclusive, showing the curve characteristics at various points A—G, inclusive, in the system 41 when the sensing surface 36 is dry or free of any material having a high heat of fusion.

Thus starting with point A in FIG. 4, the reference linear heating curve 56 is shown in FIG. 5. At point B of FIG. 4, the curve 103 of FIG. 6 represents the voltage output from the pair of differentiators 76 and shows a high negative voltage within the overall 40 second heating period. The voltage variations from the double differentiators 76 are shown to cross the negative detection level, shown as a horizontal line 104 in FIG. 6. The double crossing of the negative detection level 104 with the curve 103 produces the square wave voltage curve 86 (FIG. 7) at test point C (FIG. 4).

Differentiation by the RC differentiator 87 (FIG. 4) produces positive and negative pulses at test point D in FIG. 4 as shown by curve 88 in FIG. 8. In this case only the negative pulse which occurs during the 8 to 34 second time interval of the 40 second heating period is permitted by the switch unit 91 to pass to test point E in FIG. 4 to give curve 95 in FIG. 9. Since this negative pulse does not forward bias transistor 89 no icing condition is indicated.

It will be noted that the switch unit 82 of the timer unit 69 closes the circuit to the positive voltage level detector 79 during a six second to 25 second interval of the forty second heating period. When the positive voltage level exceeds the voltage level as determined by the variable resistor 96, the output of the amplifier 97 changes from a fixed positive voltage to a fixed negative voltage. Since for a dry condition of the sensing surface 36 of the transducer unit 35 the positive voltage does not exceed the voltage level as controlled by the resistor 96, the curve 107 at the point F in the system of FIG. 4, and shown in FIG. 10, produces no read out impulse. The curve 108 (FIG. 11) remains the same at point G in FIG. 4 so that the transistor 99 is not forward biased. For a dry sensing surface 36, therefore, the alarm circuit 93 remains open and no ice detection signal is given.

The curves shown in FIGS. 12—18, inclusive are illustrated similarly to the curves of FIGS. 5—11, respectively, for a sensing surface condition of ice or light snow at the melting point. Thus the heating curve 61 at test point A in the electrical system 41 of FIG. 4 is shown in FIG. 12. At point B the curve 119 of FIG. 13 shows a high negative voltage within the overall forty second heating period. The double crossing of the negative detection level 104 by the curve 119 produces the square voltage curve 121 of FIG. 14 at test point C in FIG. 4.

It is to be noted from the curves 122 and 109 in FIGS. 15 and 16, respectively, that the positive and negative pulses at both pints D and E in FIG. 4 occur within the 8 to 34 second timer interval of the forty second heating period as set by the switch unit 91 of the timer mechanism 69. Transistor 89 in FIG. 4 is forward biased by the positive pulse to close the relay 92 and activate the alarm circuit 93. However, the positive pulse produced by the transducer 35 and fed to the positive voltage level indicator 79 through line 81 does not exceed the voltage level imposed by the resistor 96. Thus, no change in voltage level is produced at points F and G as illustrated by curves 111 and 112 in FIGS. 17 and 18, all respectively.

FIGS. 19 through 25 are illustrated similarly to FIGS. 5 through 11, respectively, and show the readout curves produced when the sensing surface 36 is covered with light snow or ice at a temperature below the melting point. The heating curve 58 (FIG. 19) occurs at point A in FIG. 4. At point B the curve 123 of FIG. 20, which represents the voltage output from the double differentiators 76, shows a high negative voltage within the overall 40 second heating period that double crosses the negative detection level 104 to produce the square wave voltage curve 124 (FIG. 21) at test point C in FIG. 4. Differentiation by the RC differentiator 87 produces positive and negative pulses at test point D as shown by the curve 126 in FIG. 22. The positive and negative pulses of curve 113 in FIG. 23 are obtained in the same manner as the positive and negative impulses in the curve 109 of FIG. 16. However, it will be noted that these pulses in the curve 113 of FIG. 23 are shifted farther to the right on the time axis than are the pulses in the curve 109 of FIG. 16. The positive pulse in FIG. 23 thus falls within the proper time interval to produce an ice alarm. No change in voltage level is produced at points F and G (FIG. 4) as illustrated by the curves 127 and 128 in FIGS. 24 and 25, respectively.

FIGS. 26 through 32 are also illustrated similarly to FIGS. 5 through 11, respectively, and show the readout curves produced when the sensing surface 36 is covered with heavy snow or ice at below freezing temperature. Again starting with point A in FIG. 4 the heating curve 59 is shown in FIG. 26 and the curve 116 in FIG. 27 represents the voltage output of the double differentiators 76 at point B in FIG. 4. The double crossing of the negative detection level 104 with the curve 116 produces the square wave voltage curve 118 (FIG. 28) at test point C in FIG. 4. The positive and negative pulses in curve 114 of FIG. 29 were obtained in the same manner as the positive and negative pulses in the curve 88 of FIG. 8. The position of these pulses in FIG. 29 and of the negative pulse in curve 119 of FIG. 30 do not produce an ice alarm. However, as shown in FIG. 27, the curve 116 crosses the positive detection level, shown as horizontal line 117, so as to produce the square voltage waves 121 and 122 shown in FIGS. 31 and 32 at test points F and G, respectively (FIG. 4). There is thus effected a reverse bias of the transistor 98 and a forward bias of the transistor 99. Thus forward bias of the transistor 99 locks the self-latching relay 101 to activate the alarm circuit 93.

I claim:

1. A system for detecting the presence of ice, snow, frost and icing conditions on a surface as a function of the heat of fusion relative to time and temperature to provide an indication of the existence of such conditions comprising:
   a. a transducer having a sensing member mounted in said surface,
   b. means for heating said sensing member at controlled heat rate for predetermined time period,
   c. thermocouple means for sensing the temperature of said member during the heating period,
   d. voltage amplification means connected to said thermocouple means,
   e. means for feeding the voltage output of said amplification means into a double differentiator,
   f. means for reading out the voltage level of positive and negative excursions of the output of the double differentiator that occur only during a predetermined time interval within said heating period, and
   g. means for utilizing said read out voltage levels to provide an indication of the existence of said conditions.

2. A system for detecting on a sensing surface the presence of a substance having an appreciable latent heat by utilizing the latent heat as a function of time and temperature to provide an indication of the existence of such substance comprising:
   a. a transducer having a member with a substance sensing surface,
   b. means for heating said sensing member at controlled rate of heat for a predetermined time period to produce a time-temperature curve having linear characteristics,
   c. thermocouple means for sensing the temperature of said sensing member during the heating period,
   d. a double differentiator circuit for receiving the voltage output of said thermocouple means to indicate any voltage hold backs in said time-temperature curve of the sensing member,
   e. means for reading out the voltage level of positive and negative excursions of the output of said double differentiator circuit that occur only during a predetermined time interval within said heating period, and
   f. means for utilizing said read out voltage levels to provide an indication of the existence of said substance.

3. The detecting system according to claim 2 wherein:
   a. said predetermined time period is proportional to the latent heat and mass of said substance and inversely proportional to the mass of said sensing member and to said controlled rate of heat.

4. The detecting system according to claim 2 wherein:
   a. said sensing member is comprised of a material having a mass heatable to the temperature of the latent heat transfer to said substance during the predetermined time interval within said heating period.

5. The detecting system according to claim 4 including
   a. a first timing mechanism providing for the heating of said sensing member at equal periodic intervals greater than said heating period, and
   b. a second timing mechanism operable by said first timing mechanism for controlling the duration of said predetermined time interval.